(12) United States Patent
Martin

(10) Patent No.: US 11,019,216 B1
(45) Date of Patent: May 25, 2021

(54) SYSTEM AND METHOD FOR ACOUSTICALLY DEFINED REMOTE AUDIENCE POSITIONS

(71) Applicant: Joanne Michelle Martin, Concord, NH (US)

(72) Inventor: Joanne Michelle Martin, Concord, NH (US)

( * ) Notice: Subject to any disclaimer, the term of this patent is extended or adjusted under 35 U.S.C. 154(b) by 0 days.

(21) Appl. No.: 17/083,400

(22) Filed: Oct. 29, 2020

(51) Int. Cl.
*H04M 3/56* (2006.01)
*H04S 7/00* (2006.01)

(52) U.S. Cl.
CPC ............. *H04M 3/568* (2013.01); *H04S 7/302* (2013.01)

(58) Field of Classification Search
CPC ....... H04L 65/403; H04L 67/22; H04L 67/18; H04S 2420/01; H04S 7/30; H04S 2400/11
USPC .................................. 381/310, 306; 709/204
See application file for complete search history.

(56) References Cited

U.S. PATENT DOCUMENTS

| | | | |
|---|---|---|---|
| 2002/0013813 A1* | 1/2002 | Matsuoka | H04M 3/567 709/204 |
| 2006/0034463 A1* | 2/2006 | Tillotson | G08G 5/0095 381/1 |
| 2010/0215164 A1* | 8/2010 | Sandgren | H04N 7/15 379/202.01 |
| 2020/0322395 A1* | 10/2020 | Copley | H04L 65/1066 |

* cited by examiner

*Primary Examiner* — Alexander Krzystan
(74) *Attorney, Agent, or Firm* — Joanne M. Martin

(57) ABSTRACT

A system and method of the present invention that assembles an acoustic arrangement of the participants (e.g. a square grid, a circle, etc. in a venue), wherein the sounds received by each participant from each of the other participants are processed according to a model of the selected arrangement and the acoustic signature of the venue to permit each participant to localize, identify the participant location and more easily comprehend what is said or presented. Also, corresponding visual representations are placed in the corresponding visual location of the selected arrangement, and together with rapid acoustic localization of a speaking participant, mental 'overhead' is significantly reduced and the participant can resume a near normal, in-person meeting behavior. Further enhancements and features include special venue simulations which generate and maintain audience interest, and may provide excitement or other positive experience that produces participant desirability that can surpass in-person meeting or audience experiences.

20 Claims, 2 Drawing Sheets

SYSTEM AND METHOD FOR ACOUSTICALLY DEFINED REMOTE AUDIENCE POSITIONS

FIELD OF THE INVENTION

The present invention relates remote presentation and teaching systems, in particular, to remote presentation and teaching systems which form an acoustically defined assembled group representation from separated individual participants.

BACKGROUND OF THE INVENTION

In meetings formed from a plurality of autonomous participants, one or more of which may serve as leader, presenter, and/or teacher, and the participants are represented by sound (via audio signals) and image (via video signals), and have the ability to hear (via headphones or speakers receiving audio signals), and typically also to see (via video screen receiving video signals) one or more of the participants according to a meeting program (e.g. Zoom®) typically resident at a remote location to which the participants are connected, typically via computer and internet or its equivalent.

Such meetings are transient in time and arrangement of representation of the participants on screen, where typically tiles of individual faces are assembled in a square grid, and the placement of a particular face is often not fixed meeting to meeting, or during the meeting, causing delay or confusion in locating a participant unless a participant triggers identification, e.g. by speaking. During presentation or discussion among participants, often audio information, even with visual feedback, is insufficient when different multiple participants speak, resulting in difficulty or confusion in communication, especially absent subtle visual or sound cues that are present in in-person meetings.

When visual connections and images are not available, e.g. low communication bandwidth inhibits video, telephone only connection is made, and/or the participant is sight-impaired, there is difficulty in helping the listener filter out noise, or there is no sound when no one speaks except a presenter, or there is too much sound from several sources that have the same volume level, or the individual has a low quality audio connection, then much concentration and attention is needed to participate or just to listen to the group conversation or presenter's information.

As a result of such limitations and difficulties, even though a meeting may convene, much attention and energy is directed away from the topic presented, and away from truly hearing or communicating, which further inhibits productive interaction and participation. Such extra effort is unrewarded and amounts to 'mental overhead' burdens which lead to fatigue and 'meeting burnout'.

SUMMARY OF THE INVENTION

The system and method of the present invention assembles a meeting arrangement of participants with acoustic and visual representations that emulate live (and repeat) meeting characteristics of predictable and consistent audio and visual presentations according to the meeting arrangement. Once an arrangement of the participants (e.g. a square grid, a circle, clusters, etc. in a venue) is selected, participants are located in selected or assigned positions that are typically maintained throughout the 'meeting' or selectively re-grouped, and the sounds received by each participant from each of the other participants are processed according to a model of the selected arrangement within the acoustic signature of the venue, to permit each participant to localize their location within the meeting arrangement, and identify and more easily comprehend what is said or presented, so that even without visual representation, the perceived virtual audience arrangement is defined by the acoustical representations made according to the present invention. Embodiments include contouring the sound to diminish sound to and from more distant participants to allow local (in the selected arrangement) conversations with reduced distraction to other participants. Also, visual representations are placed in the corresponding visual location of the selected arrangement, and together with rapid acoustic localization of a speaking participant, mental 'overhead' is significantly reduced and the participant can resume a near normal, in-person meeting behavior.

Further enhancements and features include corrective and special acoustic processing, and special venue simulations which generate and maintain audience interest, and may provide excitement or other perceived positive participation experience that surpasses participant experiences of an in-person meeting or assembly.

BRIEF DESCRIPTION OF THE DRAWINGS

These and additional features according to the present invention will be further understood by reading the following Detailed Description together with the Drawing figures, wherein.

DETAILED DESCRIPTION

Figure 1:
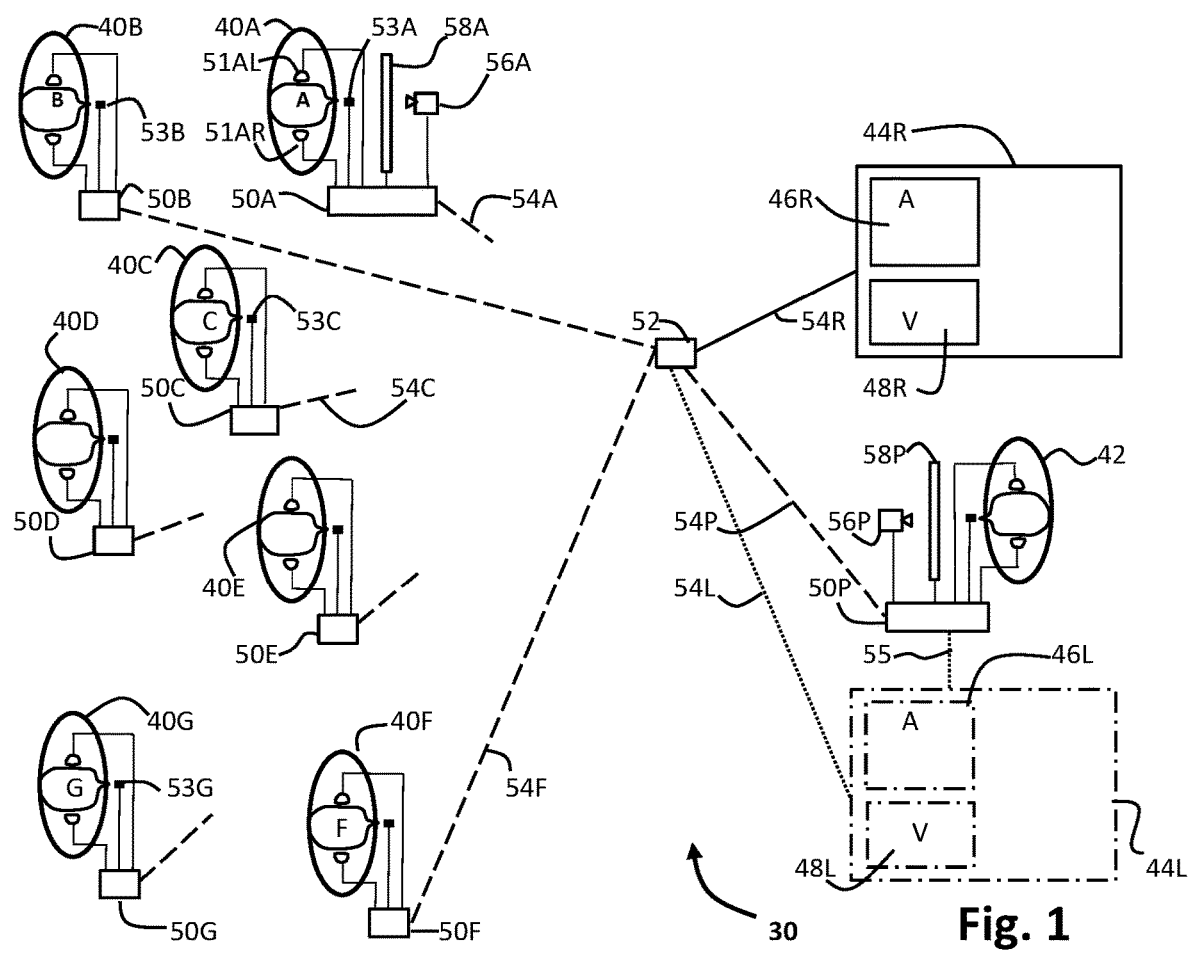
FIG. 1 is a block diagram of an embodiment of the present invention of a meeting connection among participants and with a presenter.

A block diagram 30 of an embodiment of the present invention is shown in FIG. 1, wherein separately located multiple participants 40A, 40B, 40D, . . . 40G have audio connection and communicate with each other, and in some embodiments with a further presenter designated a common presenter 42, via a meeting, class, or assembly remote presenter system 44R that may also include image and video connection processing system 48R between and among participants 40A . . . 40G and presenter 42. The presenter system 44R includes an audio processor or processing module 46R that is configured to receive audio from each of the participants 40A . . . 40G and the presenter 42, and optionally also include external or internal sound sources (e.g. sound libraries, files, etc.) to be selectively sent to the participants and presenter, and optionally include recording processors or modules configured to selectively record presenter system 44A audio. Alternately, a local presenter system 44L (or presenter interface/processor 50P) may function, entirely or in part, to duplicate or replace selected functions thereof to augment performance, as the remote presenter system 44R and include a local audio processor or processing module 46L and video processor or module 48L, but be located proximal to the presenter 42, and may communicate separately to the participants 40A . . . 40G and the presenter 42, or be configured to directly 55 receive and transmit the presenter 42 headphone (preferably binaural) and microphone signals. Alternately, binaural/stereophonic or multichannel (e.g. 5.1 channel surround) participant and/or presenter loudspeaker audio systems may serve in place of any headphone to place each participant and/or presenter in a selected virtual arrangement and acoustic setting.

The participants 40A . . . 40G and presenter communicate via corresponding simplified representations of network interfaces 50A . . . 50G (which are typically computer processors or an integrated computer, e.g. laptop, with program and data memory, audio input microphone, speaker/earphone jack, camera, and further represent any necessary computer-to-network modem, router, etc. connecting and interface equipment connected as known in the art) with remote presenter system network interface 52 (or optionally directly with presenter network interface 50P if presenter system 44L is communicating via presenter interface 50P) with wired or wireless (e.g. network, internet, optical, etc.) connections 54A . . . 54F, 54R, 54L, 54P or equivalent, through a network server, system, interface, etc. 52 or directly. In one embodiment, the network interfaces 50A . . . 50G, and/or 50P typically comprise participant's computers or equivalent, which further include necessary headphone and microphone converters, processors, etc. that provide the end-to-end connection between the presenter system 44R or 44L and the participants 40A . . . 40G and/or presenter 42.

Visual signals are also conveyed from participants' cameras 56A et al to the presenter system 44R or 44L, and video signals are conveyed to the participants' video screen 58A et al via the corresponding network interfaces 50A . . . 50G, as well as the presenter's visual camera signal and video screen signals via network interface 50P (or directly via local processor 46L connection 55).

Figure 2:
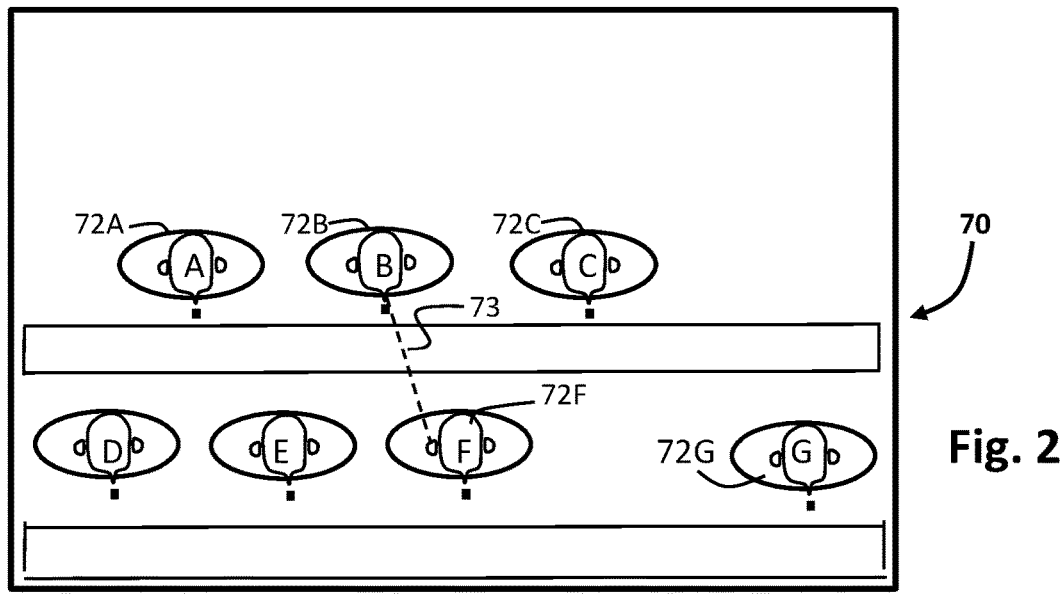
FIG. 2 is a simplified view of a screen presentation of the participants according to an embodiment of the present invention.

According to one embodiment of the present invention, the separated participants 40A . . . 40G are assigned or select a location, e.g. 72A . . . 72G, in a 'synthesized' seating plan 70 of FIG. 2 as configured by the video processor 48R or 48L selected from several preset seating arrangements, or custom arrangements, e.g. circle, group cluster, etc., as created by the presenter 42 or participant(s), or any other suitable arrangement between or among participants, and a representative image (e.g. a still photo or camera 56A et al image) is placed in the selected position 72A . . . 72G. According to an embodiment, the sound amplitude between participants will be adjusted to reflect the intervening distance (e.g. apply an attenuation of 1/{distance squared}, apply reverberation according to a selected virtual architecture, etc.; other contours may be used) between participants, the expected head direction and which ear is closer, environment acoustics (e.g. sound booth, classroom, arena, concert hall, or vehicle ambience, 'room tone', masking noise, intentional distractions at specific virtual locations, etc.) EQ, and/or other enhancements and/or acoustic 'treatments'. For instance, the relative sound level (speaking and hearing) between locations 72A and 72G has greater attenuation than between locations 72B and 72F. Typically, the parameters defining the acoustic processing and combining are provided according to a model of the synthesized venue, or from actual measurements of an actual or similar venue, or empirically determined, and stored for retrieval in memory, typically as a 'look up table' that are modifiable according to the participant position in the venue, and if binaural (stereophonic) earphones or speakers are available, whether sound is to be provided to the right or left ear. The system and methods of the present invention are also applicable for monaural (1-channel) participant and/or presenter headphone or speaker, but without providing the different sound for each ear, typically resulting in the loss directional and other acoustic information.

Figure 3:
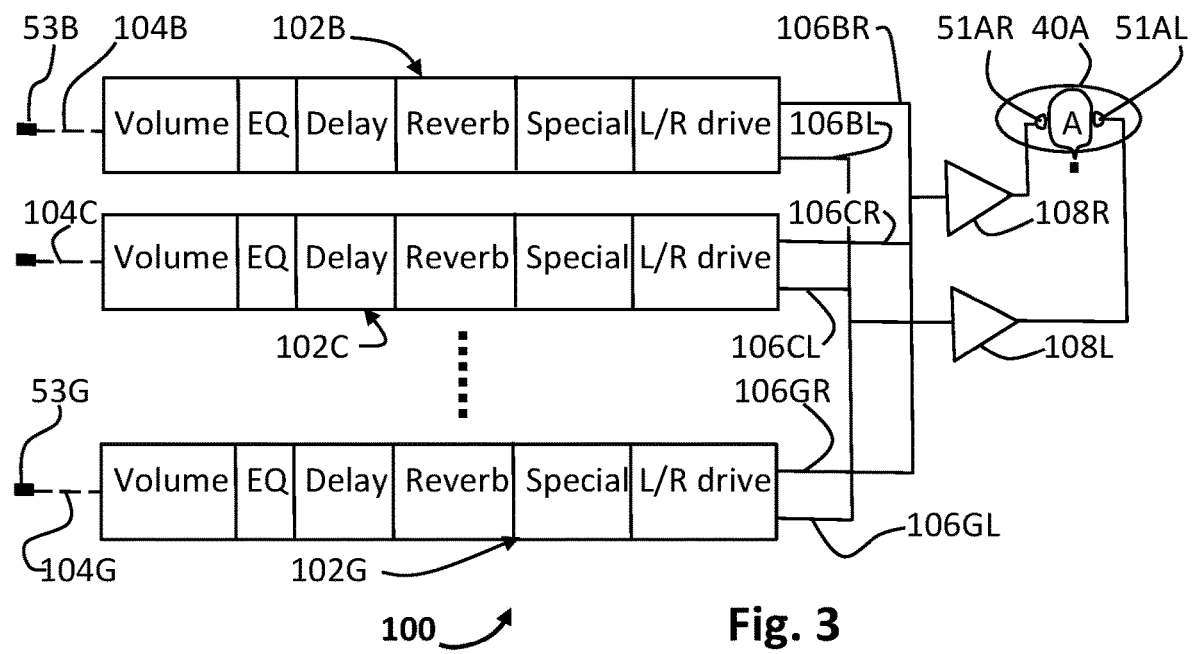
FIG. 3 is a block diagram of an exemplary acoustic processor and individual participant connections according to an embodiment of the present invention.

Since the sound at the ears of each participant and the presenter 42 are received along different paths from the participant who utters a sound, the raw sound signals from each participant (an optionally also from the sound receiving participant them self and having a separate channel 102A not shown) represented by one participant 40A, is processed via a separate processing channel 102B, 102C, . . . 102G in the exemplary embodiment 100 of FIG. 3. The channel signal inputs 104B, 104C, . . . 104G are received from respective microphones 53B, 53C, . . . 53G via the direct wire or internet or any suitable connections, and are processed 102B, 102C, . . . 102G according to relative volume, equalization (EQ), delay, reverberation, special effects, etc. and adjusted for binaural (stereophonic) output drive corresponding to the particular left (51AL) and right (51AR) ear of the participant, in the example of FIG. 3.

Since identification and direction is determined in part by minute differences in sound applied to the left and right ears of a single participant, each channel 102B, 102C, . . . 102G provides such minute changes to the binaural sound received by the participant to allow that participant to spatially determine the relative location of the origin of the sound as though it were coming from the sound-originating participant as though coming from a position designated by the selected virtual seating plan, e.g. 70, FIG. 2, and according to the normal head position of the seating plan (e.g. adjust intensity and delay to accommodate a slightly longer path to one ear). For instance, relatively close separation, e.g. 73 between participants B, 72B and F, 72F of FIG. 2, will have less attenuation in communication between those participants (and more attenuation with more distant virtually located participants, e.g. 72A to 72G) and not the actual isolated or distant positions of participants B, 40B and F, 40F or close positions of 40A and 40B of FIG. 1, even if they are located in the same physical venue.

If the receiving participant (e.g. 40A here) has only monaural headphones, according to other embodiments of the present invention, only a single channel output need be used, while multi-channel loudspeaker (e.g. 5.1 surround) audio would have additional processing channels (FIG. 3, not shown) to deliver the appropriate channel output signal according to the corresponding encoding process and hardware. The right ear outputs 106BR, 106CR, . . . 106GR from each processing channel 102B, 102C, . . . 102G are summed and amplified 108R and delivered to the right ear 51AR of the headphone, and the left ear outputs 106BL, 106CL, . . . 106GL from each processing channel 102B, 102C, . . . 102G are summed and amplified 108L and delivered to the left ear 51AL of the headphone. Each participant, e.g. 40G, receives headphone signals that are similarly received from all other participants, e.g. 40A, 40B, . . . 40F. The processing hardware (e.g. 50A-50F, 44R, 44L, etc.) may comprise separate computational engines and memories, and/or may comprises software instructions resident in the processing module 46R or 46L to simultaneously process all channels (e.g. 102A-102G) for each participant. Processing e.g. 100 may also be distributed in part or entirely, among the individual participant processors 50A-50L, 50P such as audio pre-processing to correct deficiencies of the participant's microphone or common or unchanging aspects of the system 30 virtual image construction of FIG. 2. According to other embodiments, other processes made by one skilled in the art are included within and between processing channels.

Included is provision for the presenter 42 to similarly receive a similarly process set of microphone 53A, . . . 53G signals processed (e.g. like 102A) to be able to place the participant according to the selected seating plan, e.g. 70, FIG. 2. The systems according to the present invention further include a 'bypass' control to allow the distance-related attenuation to be disabled so as to permit a presenter and/or the participant to converse as though at a close range (not distance attenuated) volume with one, some, or all desired recipient (participant and/or presenter), and selectable to be private (between selected participants, etc.) or global (to all). Such bypass may be initiated by computer keyboard stroke (or a connected switch), body gesture monitored by the computer camera 56A or equivalent and processed by the computer e.g. 50A, a 'touch screen' (e.g. 58A or equivalent) connected to a computer (e.g. 50A or equivalent processors) detected touch. Furthermore, direct communication may be established between a participant to a selected other participant (including presenter) by the participant touching their display's (e.g. 58A using processing of associated or remote processors discussed herein) image (e.g. one or more of FIG. 2) of the selected other participant providing audio connection (e.g. via system of FIG. 1 and channels of FIG. 3), wherein such connection may also be private between two participants or to also include adjacent or other participants, as desired.

Alternate embodiments may include an acoustic model of an environment, e.g. a hall, that includes signature characteristics, e.g. long and short reverberation times, audience or background noise ("room tone"), amplifying or attenuating, equalizing, threshold gating, adding reverberation, adding delay, adding masking noise, compressing received audio signals, relative motion effects between participants, etc. that may be applied to all participants, or to selected one(s), via the corresponding headphone or microphone channel, and adjusted to correspond to desired relative positioning. For instance, an outlier participant may be virtually placed (by themselves or by the presenter) in the rear of a simulated hall according to location-defined acoustic model having corresponding acoustic signature including reverberation, tonal contour, decay over distance, etc., apart from other participants, and corresponding acoustic delays are applied to the headphone and microphone channels, as well as adding corresponding reverberation, loss in volume intensity, and EQ, while another participant may be synthetically 'seated' next to the outlier participant with much less reverberation, loss in volume, and a different (more intimate) EQ. For multichannel (e.g. 5.1, 7.1, . . . 11.2.4, etc. surround, e.g. by U.S. Pat. No. 7,443,987 incorporated by reference or other arrangements as are known in the art) sound systems, the channels of FIG. 3 are increased in number to provide correspondingly processed signals for the additional speaker positions (e.g. surround, center, height, LFE, etc.).

A further alternate embodiment includes selectable audio enhancement or processing as applied to the listening (headphone) channel and separately (if desired) to the speech (microphone) channel of each participant and may be selected by the corresponding participant 40A . . . 40G and/or the presenter 44. Headphone processing can include equalization (EQ) and other known acoustic processing, e.g. noise removal, compression, reverberation, etc., to accommodate listener preferences. The microphone channel of a participant may also include on/off, EQ and other processing (e.g. like 102B) to remove noise at the microphone environment, adjustment for a bad microphone quality, etc., or as desired. Furthermore, acoustic processing having a particular theatric characteristic, e.g. 'fighter pilot', 'dungeon', 'robot', may be applied (e.g. by the presenter) to a selected participant microphone signal for variety or reward for achievement by the presenter, i.e. the best performer can sound like a 'Top Gun' fighter pilot, or a different accent, for a period of time.

The number of participants was limited for clarity; greater numbers are within the scope of the present invention. The novel system and processes do not limit the dimensions of the virtual environment model and the positions of the participants therein to 2 dimensions, and may further include relative motion and change of rate of motion within the selected virtual environment model and between participants. Modifications and substitutions made by one of ordinary skill in the art are within the scope of the present invention which is not limited except by the claims which follow.

What is claimed is:

1. A process for presenting a virtual arrangement of participants from individual participant acoustic signals, comprising:

receiving an audio signal corresponding to acoustic output associated with a specific originating participant;

defining an acoustic environment;

defining a desired location of said originating participant within said acoustic environment as a point of origination of said acoustic signal from said participant;

defining a desired location within said acoustic environment of a receiving participant as a point of receiving each of said originated acoustic signals;

processing said originating participant audio signal according to said originating participant desired location to form a processed point of origination signal, and forming an audio signal according to said desired location within said acoustic environment of said receiving participant receiving said processed point of origination signal to provide a received processed signal representing said originating participant said acoustic signals as though said originating participant and receiving participant said acoustic signals were coming from and received at corresponding points of origination and receiving in said acoustic environment; and providing an audio output signal from said formed audio signal for said receiving participant.

2. The process of claim 1, wherein defining said desired locations of said originating and of said receiving participants in said acoustic environment is provided according to a selected spacing between a plurality of said receiving participants.

3. The process of claim 2, further including defining an arrangement of a plurality of originating participants each having a desired location, said arrangement comprises selecting spacing according to at least one of a grid, a circle, and a group.

4. The process of claim 1, wherein defining an acoustic environment comprises selecting at least one of a sound booth, a classroom, an arena, a concert hall, a vehicle, and an open area.

5. The process of claim 1, wherein said processing comprises effects of at least one of amplifying or attenuating, equalizing, threshold gating, adding reverberation, adding delay, adding 'room tone', adding masking noise, adding distractions noises at specific virtual locations within said acoustic environment, compressing said received audio signals, relative motion simulation between participants, and additional dimension modeling of effects.

6. The process of claim 1, wherein said processing includes diminishing said received audio output signal according to an increasing distance between said defined point of origination and a corresponding point of receiving.

7. The process of claim 1, further including receiving a participant control signal, and selectively modifying said processing at least one of said originated acoustic signal and said received acoustic signal according to said received control signal.

8. The process of claim 7, further including generating said control signal according to at least one of a detected keyboard action, a switch closure, a body gesture, and a touch screen contact.

9. The process of claim 1, wherein processing includes adding a theatrical effect to at least one of said plurality of received audio signals.

10. The process of claim 1, further including generating a video signal representation of each of a plurality of participants in a graphic representation of said acoustic environment.

11. A system for acoustically defining audience participant positions from disparate individual participants, comprising:
    a plurality of participant systems including a first participant system and a second participant system, each providing an incoming audio signal corresponding to an acoustic signal of one a corresponding first participant and a corresponding second participant, and each receiving an outgoing audio signal for each of corresponding first participant and a second participant corresponding to an acoustic signal to be sent to a corresponding one of said first participant and said corresponding second participant;
    an acoustics processor including a model of a selected acoustic environment,
        receiving said incoming audio signal from said first participant system having an associated first participant defined location within said model of a selected acoustic environment, and
        generating an outgoing audio signal for said second participant system having an associated second participant defined location within said model of a selected acoustic environment, according to said incoming audio signal processed
            according to said first participant defined location within said modeled acoustic environment, and
            according to said second participant defined location within said modeled acoustic environment; and
    a display system for displaying a visual representation of each of said first participant defined location and said second participant defined location within a representation of said selected acoustic environment.

12. The system of claim 11, wherein at least one of said plurality of participant systems is remotely located from another of said plurality of participant systems.

13. The system of claim 12, wherein said acoustics processor is remote from all participant systems.

14. The system of claim 12, wherein said display system includes a display processor, and an image display located at said participant system.

15. The system of claim 12, wherein said acoustics processor is distributed among participant systems.

16. The system of claim 11, wherein said acoustics processor includes processing of said received audio signal according to at least one of amplifying or attenuating, equalizing, threshold gating, adding reverberation, adding delay, adding 'room tone', adding masking noise, adding distractions noises at specific virtual locations within said acoustic environment, compressing said received audio signals and a theatrical effect.

17. The system of claim 16, wherein said acoustics processor includes diminishing said received audio output signal according to an increasing distance between said first defined location and said second defined location.

18. The system of claim 17, further including
    at least one of a detected keyboard action, a switch closure, a body gesture, and a touch screen contact for generating a control signal, wherein said acoustics processor is adapted to selectively modify said generated audio for at least one of said second participant system in response to said control signal.

19. The system of claim 11, wherein said second participant system comprises one of a plurality of participant systems, each having a different defined location within said modeled acoustic environment, and from said acoustics processor, a corresponding different generated audio signal.

20. A system for acoustically defining audience participant positions from disparate individual participants, comprising:
    a plurality of audio inputs each receiving a corresponding audio signal from one of a plurality of remote source participants and providing a corresponding audio input signal representations;
    an audio processor including a model of a selected virtual acoustic environment, adapted to process each of said plurality of audio input signal representations and generate an audio output signal representation for each remote source participant at a defined location within said selected virtual acoustic environment according to said defined location of each said received remote source participants audio signal representation and processed according to a defined location within said modeled acoustic environment of a listening participant at a corresponding defined location, to provide a corresponding said output signal representation for each source participant, wherein said defined location of said source participant and said defined location of said listening participant are made according to a selected arrangement within said model of said selected virtual acoustic environment in at least 2 dimensions; and
    at least one audio output providing an audio output representation of said listening participant audio output signals to provide said listening participant a perception of the corresponding defined locations of said plurality of the source participants within said virtual acoustic environment.

* * * * *